(12) United States Patent
Coupeté et al.

(10) Patent No.: US 11,153,485 B2
(45) Date of Patent: Oct. 19, 2021

(54) AUTOMATED CAMERA MODE SELECTION USING LOCAL MOTION VECTOR

(71) Applicant: GoPro, Inc., San Mateo, CA (US)

(72) Inventors: Eva Coupeté, Paris (FR); Etienne Terree, Paris (FR); Adrien Cariou, Paris (FR)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 16/561,811

(22) Filed: Sep. 5, 2019

(65) Prior Publication Data

US 2021/0075965 A1    Mar. 11, 2021

(51) Int. Cl.
| | |
|---|---|
| *H04N 5/232* | (2006.01) |
| *G06T 7/246* | (2017.01) |
| *H04N 5/225* | (2006.01) |
| *H04N 5/14* | (2006.01) |

(52) U.S. Cl.
CPC ......... *H04N 5/23245* (2013.01); *G06T 7/246* (2017.01); *H04N 5/145* (2013.01); *H04N 5/2258* (2013.01); *H04N 5/23251* (2013.01)

(58) Field of Classification Search
None
See application file for complete search history.

(56) References Cited

U.S. PATENT DOCUMENTS

| | | | | |
|---|---|---|---|---|
| 2009/0102935 A1* | 4/2009 | Hung | ................... | G03B 7/093 348/222.1 |
| 2010/0271494 A1* | 10/2010 | Miyasako | .......... | G06K 9/00261 348/208.1 |
| 2011/0122271 A1* | 5/2011 | Nobuoka | ........... | H04N 5/23245 348/220.1 |
| 2012/0314094 A1* | 12/2012 | Shibata | ............... | H04N 5/23267 348/208.6 |
| 2017/0155842 A1* | 6/2017 | Takayanagi | ........ | H04N 5/23267 |
| 2017/0264824 A1* | 9/2017 | Kuchiki | ................... | G06T 7/11 |
| 2018/0067334 A1* | 3/2018 | Gyotoku | ............ | H04N 5/23254 |
| 2018/0288330 A1* | 10/2018 | Miyazawa | ......... | H04N 5/23258 |

* cited by examiner

*Primary Examiner* — Twyler L Haskins
*Assistant Examiner* — Wesley J Chiu
(74) *Attorney, Agent, or Firm* — Younge Basile Hanlon & MacFarlane, P.C.

(57) ABSTRACT

Automated camera mode selection using local motion vectors is described. An image capture device includes an image metric estimation unit to detect a presence or level of an image metric in a scene of an image to capture based on image metric inputs, a motion estimation unit to determine a level of movement within the scene using ratios of histograms based on local motion vectors, a mode selection unit to select a camera mode for capturing the image based on outputs of the image metric estimation unit and the motion estimation unit, and an image sensor to capture the image according to the selected camera mode. The motion estimation unit computes a norm for each local motion vector, generates a histogram from the computed norms, determines movement metrics based on the ratios of histograms associated with different norm thresholds, and identifies the level of movement based on the movement metrics.

20 Claims, 18 Drawing Sheets

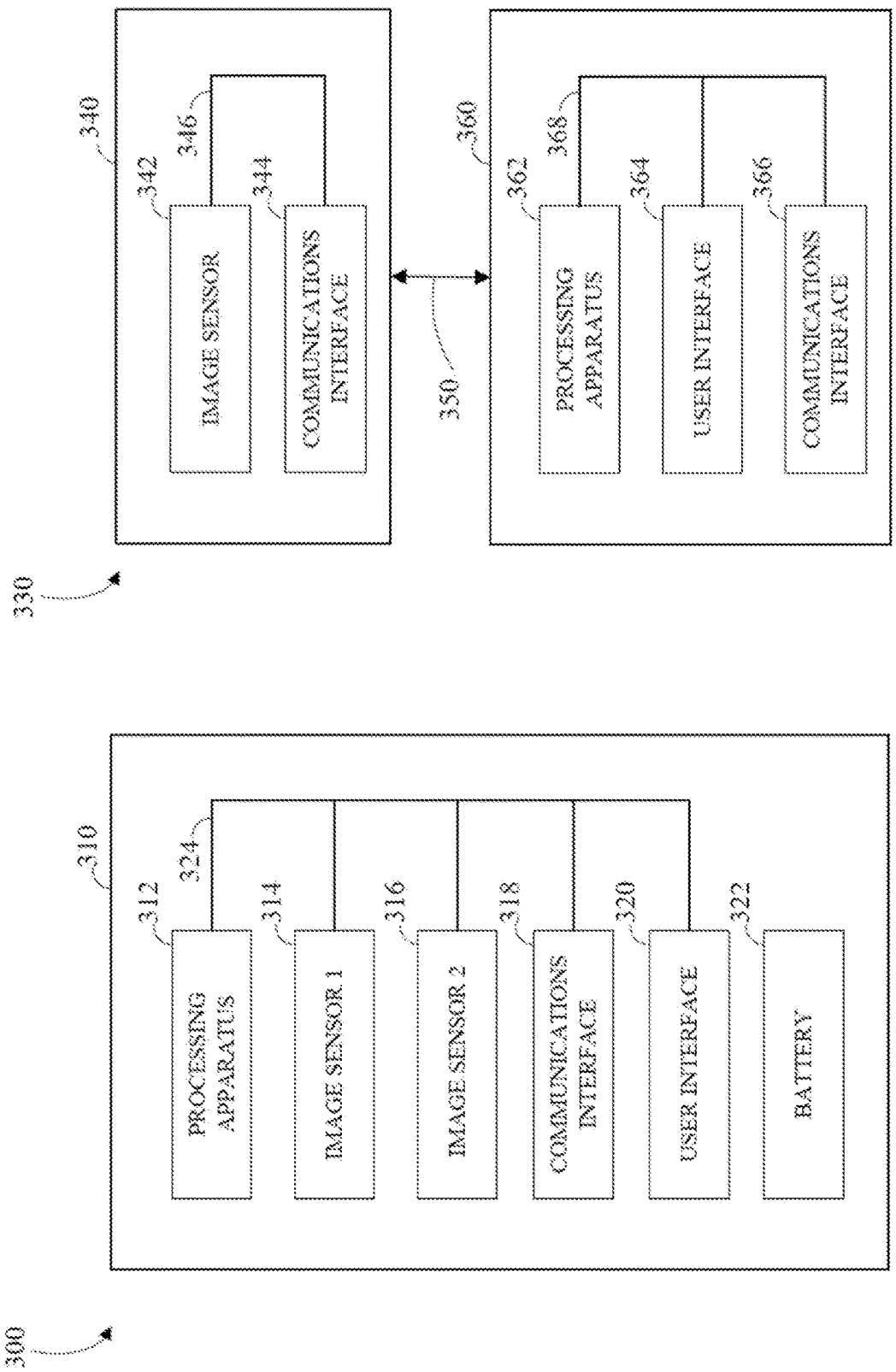

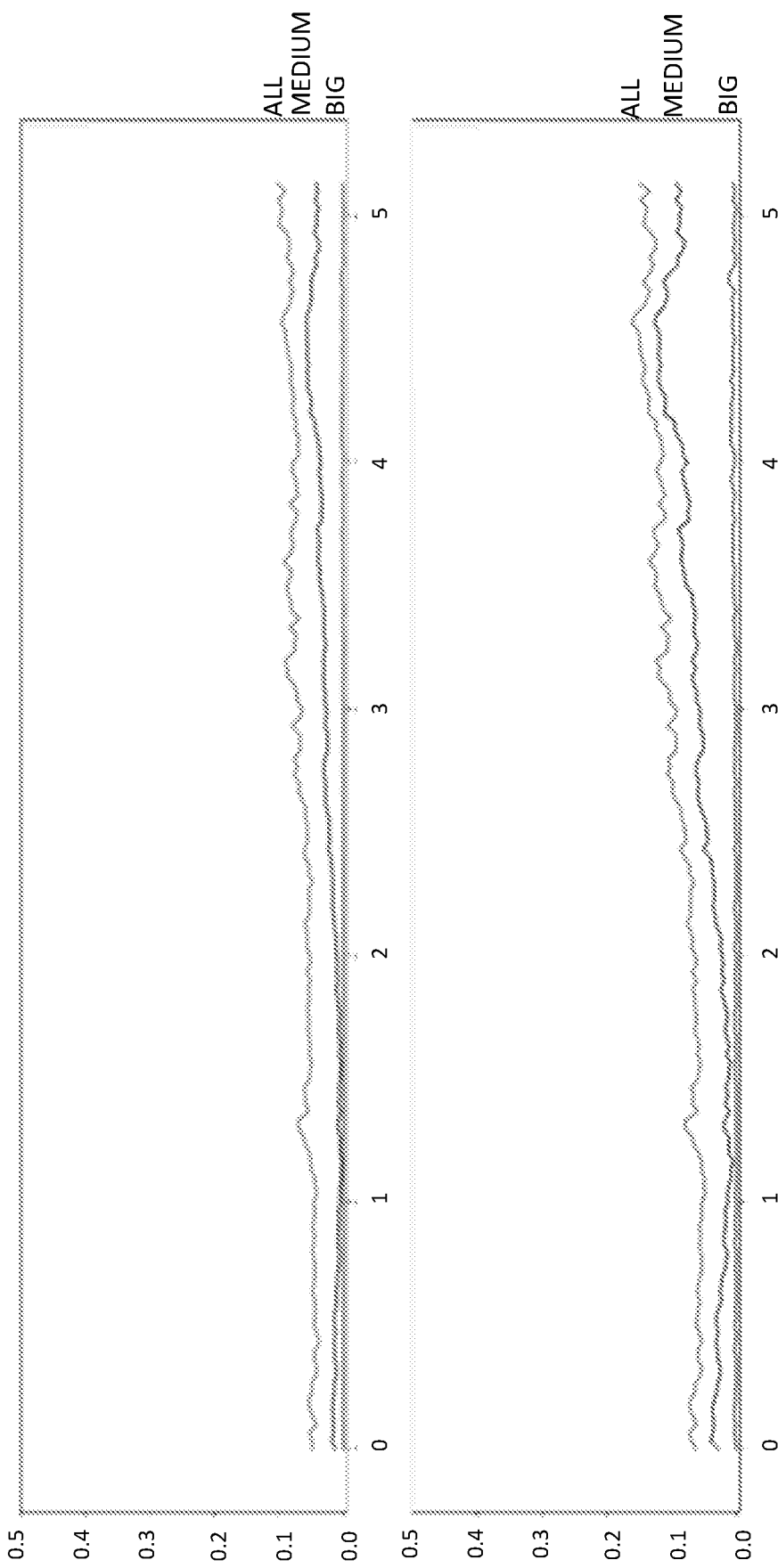

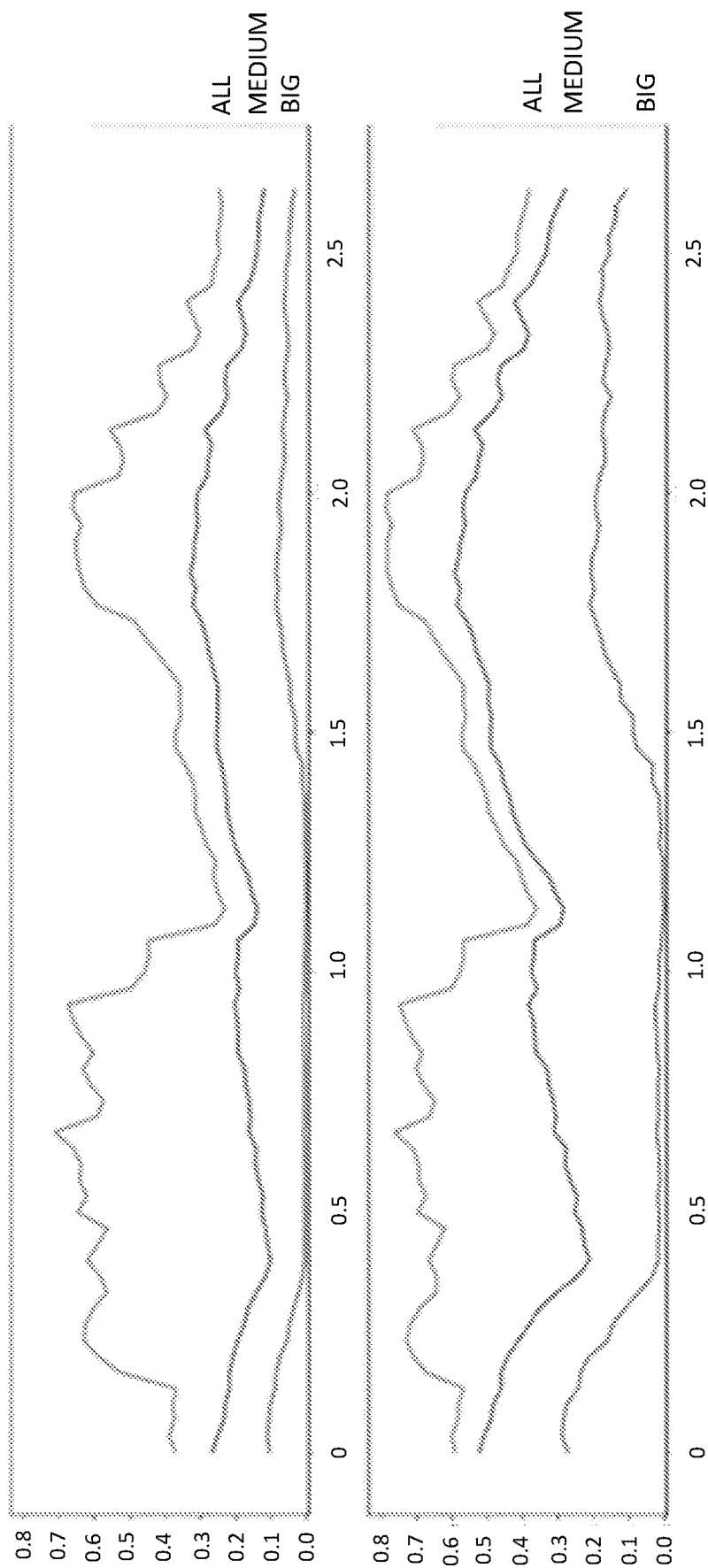

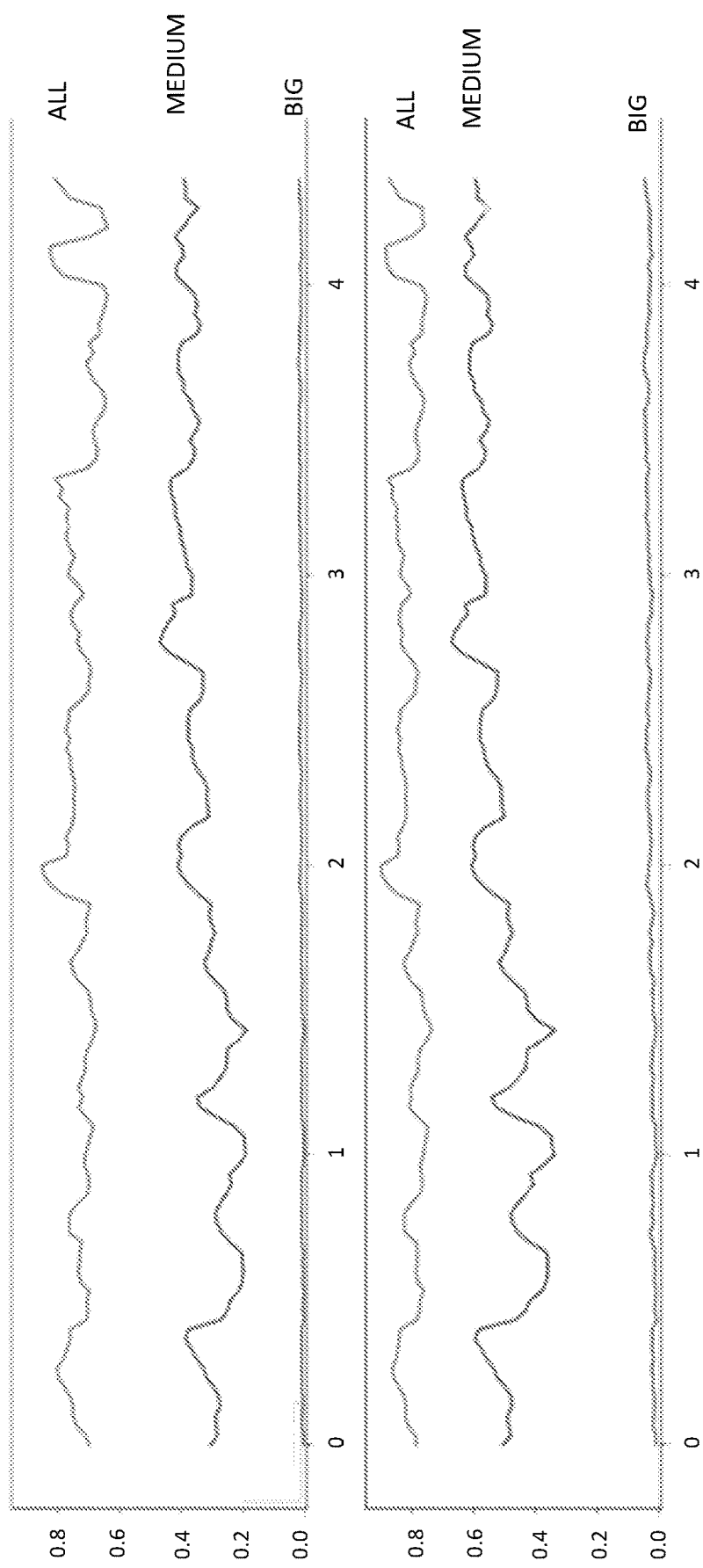

AUTOMATED CAMERA MODE SELECTION USING LOCAL MOTION VECTOR

TECHNICAL FIELD

This disclosure relates to automated camera mode selection.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. The configurations used by the image sensor to capture the images or video may in some cases have an effect on the overall quality of the images or video. For example, different configurations may be used based on a particular camera mode selected for capturing the images or video.

SUMMARY

Disclosed herein are implementations of automated camera mode selection using local motion vectors. In an implementation, an image capture device for automated camera mode selection includes one or more image metric estimation units configured to detect a presence or level of an image metric in a scene of an image to capture based on one or more image metric inputs, a motion estimation unit configured to determine a level of movement within the scene using ratios of histograms based on local motion vectors, a mode selection unit configured to select a camera mode to use for capturing the image based on outputs of the one or more image metric estimation units and the motion estimation unit, and an image sensor configured to capture the image according to the selected camera mode.

In an implementation, a motion estimation unit computes a norm for each local motion vector, generates a histogram from the computed norms, determines movement metrics based on the ratios of histograms associated with different norm thresholds, and identifies the level of movement in the scene based on the movement metrics.

In an implementation, a motion estimation unit further determines a movement metric for all movements by using a first norm threshold, and computes a ratio between all bins in the histogram meeting or exceeding the first norm threshold and all bins in the histogram. The motion estimation unit further determines a movement metric for all medium movements by using a second norm threshold, and computes a ratio between all bins in the histogram meeting or exceeding the second norm threshold and all bins in the histogram. The motion estimate unit further determines a movement metric for all big movements by using a third norm threshold, and computes a ratio between all bins in the histogram meeting or exceeding the third norm threshold and all bins in the histogram.

In an implementation, the motion estimate unit further applies a weight vector to the histogram to generate a weighted histogram to favor defined movement metrics. In an implementation, the defined movement metrics have a norm threshold greater than unity. In an implementation, the weight vector has increasingly greater weight values for increasingly higher valued norms.

In an implementation, a method for automated camera mode selection includes receiving local motion vectors corresponding to motion or movement in a scene of an image to capture, computing a norm for each local motion vector, generating a histogram from the computed norms, determining movement metrics based on ratios of the histograms for different norm thresholds, identifying a level of movement in the scene based on the movement metrics, and applying the identified level of movement to a camera for capturing the image. In an implementation, the method further includes setting a defined norm threshold for each movement metric, and computing a ratio between all bins in the histogram meeting or exceeding the defined norm threshold and all bins in the histogram.

In an implementation, the method further includes multiplying the histogram with a weight vector to generate a weighted histogram which favors movement metrics having norm thresholds greater than unity. In an implementation, the weight vector has increasingly greater weight values for increasingly higher valued defined norm thresholds. In an implementation, the weight vector has a non-unitary weight for each defined norm threshold greater than unity.

In an implementation, a method for automated camera mode selection includes determining, for a scene of an image to capture, at least one image metric based on an associated image metric input, determining, for the scene, a motion level using ratios of histograms based on local motion vectors, selecting a camera mode to use for capturing the image based on each determined image metric and the motion level, and capturing the image according to the selected camera mode. In an implementation, the method further includes calculating a norm for each local motion vector, producing a histogram from the computed norms, providing a set of defined movement metric thresholds, computing ratios of histograms for each defined movement metric threshold, and establishing the motion level in the scene based on the computed ratios. In an implementation, the method further includes skewing the histogram with a weight vector toward certain defined movement metric thresholds. In an implementation, the certain defined movement metric thresholds are greater than one. In an implementation, increasingly greater weights are applied to increasingly higher defined movement metric thresholds. In an implementation, the weight vector has a non-unitary weight for each defined movement metric threshold greater than unity. In an implementation, the at least one image metric is one of high dynamic range and light intensity.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

FIGS. 7A-12B are graphs of movement metrics determined using ratios of histograms which are based on local motion vectors and ratios of weighted histograms which are based on local motion vectors.

DETAILED DESCRIPTION

Figure 1A:
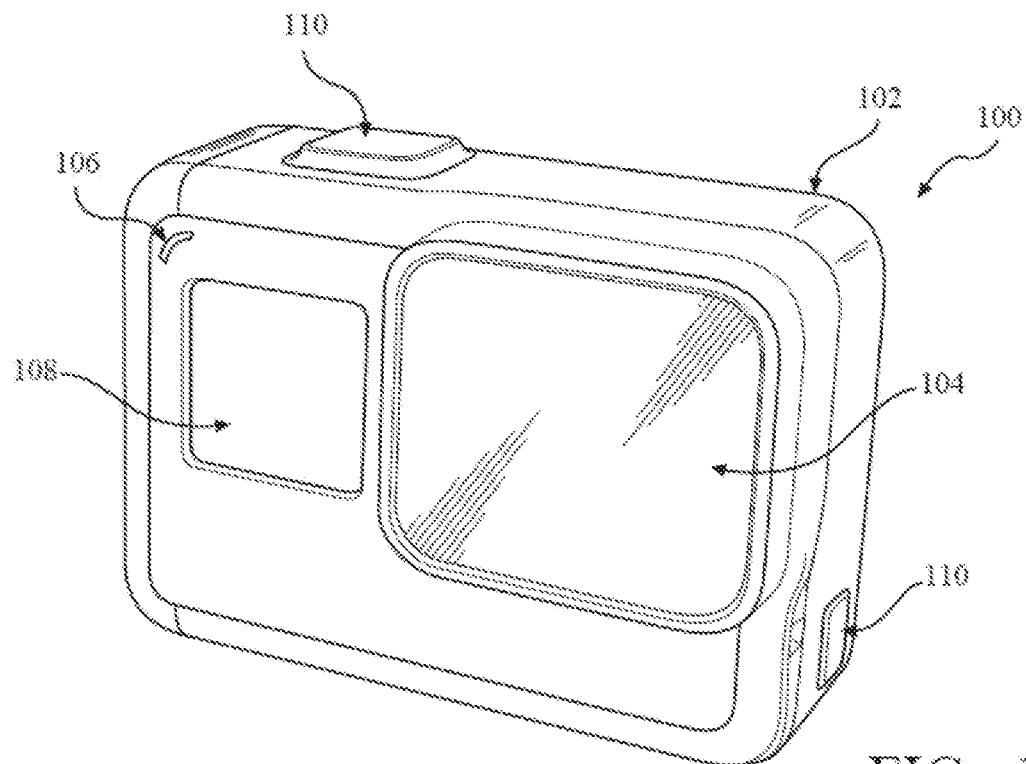
FIGS. 1A-D are isometric views of an example of an image capture device.

An image capture device may capture the image according to image capture configurations of a selected camera mode. For example, a user of the image capture device may select a camera mode to capture the image. The selection may be based on one or more criteria including, for example, an amount of background light, a location of a subject relative to the image sensor, or a motion of the subject. Examples of camera modes that may be available for selection include, without limitation, a still mode, still +local tone mapping (LTM) mode, high dynamic range (HDR) mode, and multi-frame noise reduction (MFNR) mode.

Each of those camera modes may be best suited for particular situations. For example, the still +LTM mode may be preferable where there is low to mid (e.g., 100 to 800) International Organization for Standardization (ISO), with or without motion, and a low amount of noise. In another example, the HDR mode may be preferable where there is low to mid ISO, the location of the image to capture is somewhere outdoors, motion is detected up to a certain degree (small motion), and where this is a low amount of noise. In yet another example, the MFNR mode may be preferable where there is high (e.g., more than 800) ISO, up to a certain noise level, and not too much motion. The highest quality image or video may result from using the most preferable camera mode given the situation.

In many cases, the user of the image capture device may not select the best camera mode to use at a given time or in a given place. For example, the user may not recognize that the background of an image to capture does not have enough light for a selected mode or that an object to be captured within the image has a motion that may not be captured very well using a selected mode. Furthermore, even if the user of the image capture device selects an appropriate camera mode for capturing a first image, that camera mode may not be the best camera mode for capturing a subsequent image. That is, motion, lighting, or other conditions within a location in which the images are captured may change over a short amount of time. If the user does not account for these changes and select a new camera mode, the subsequently-captured image may be low quality.

Implementations of this disclosure address problems such as these using automated camera mode selection systems and techniques. The implementations of this disclosure are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
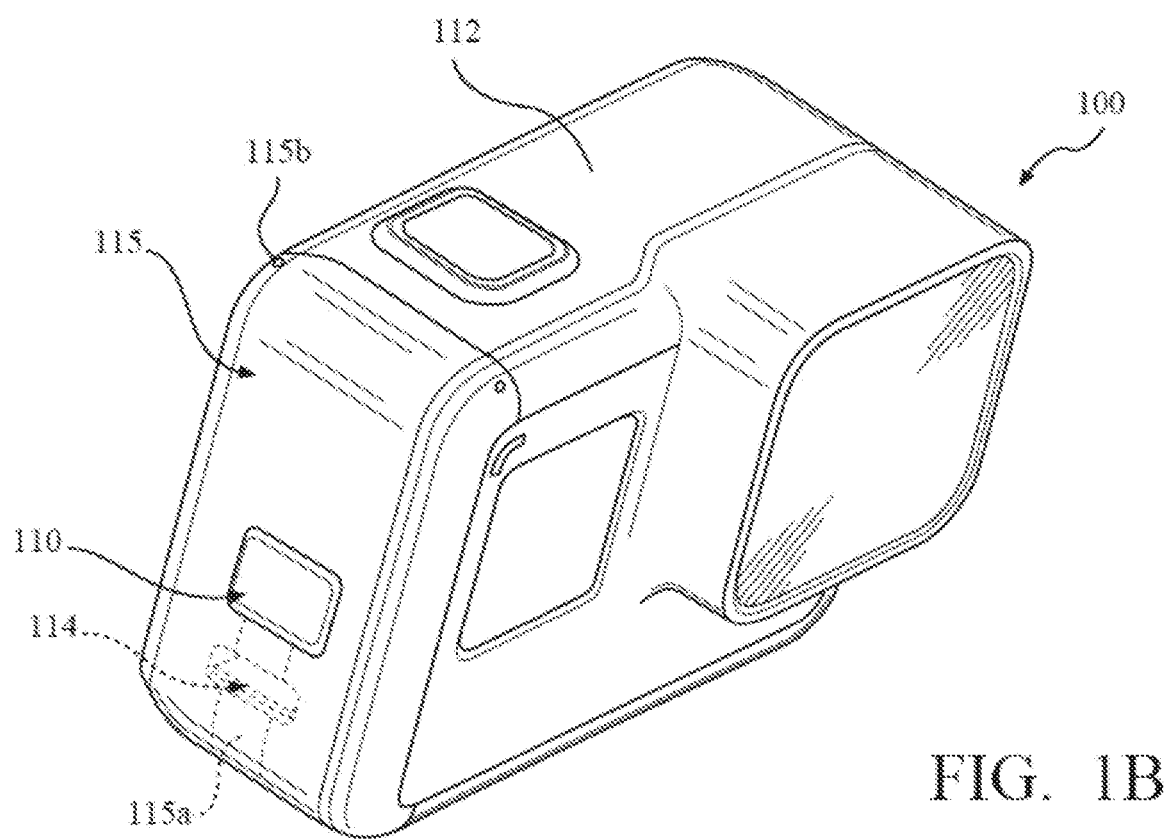
Figure 1C:
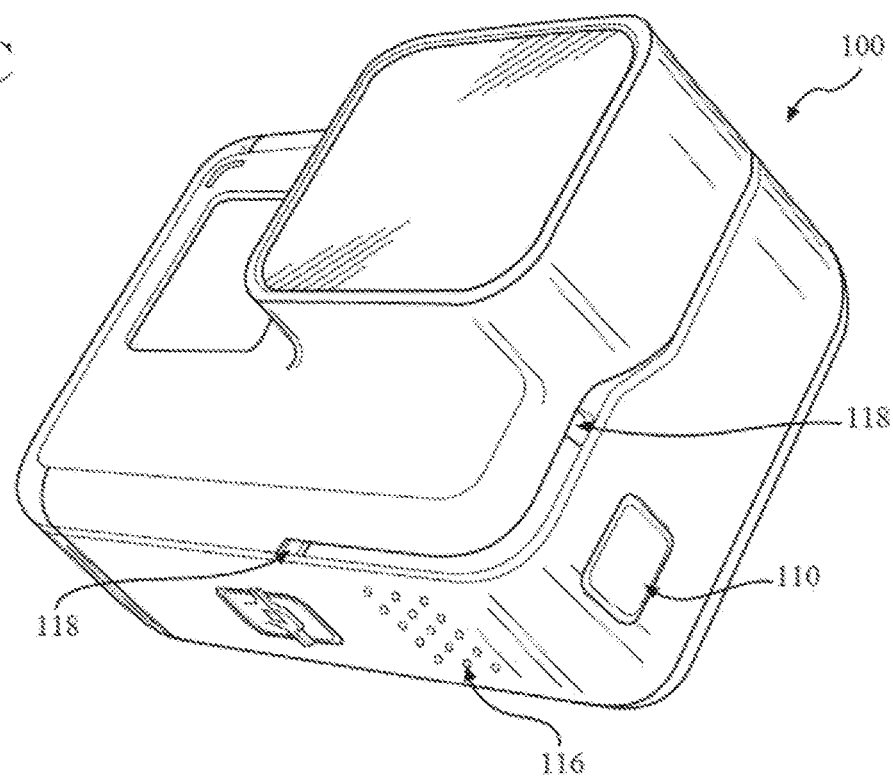
Figure 1D:
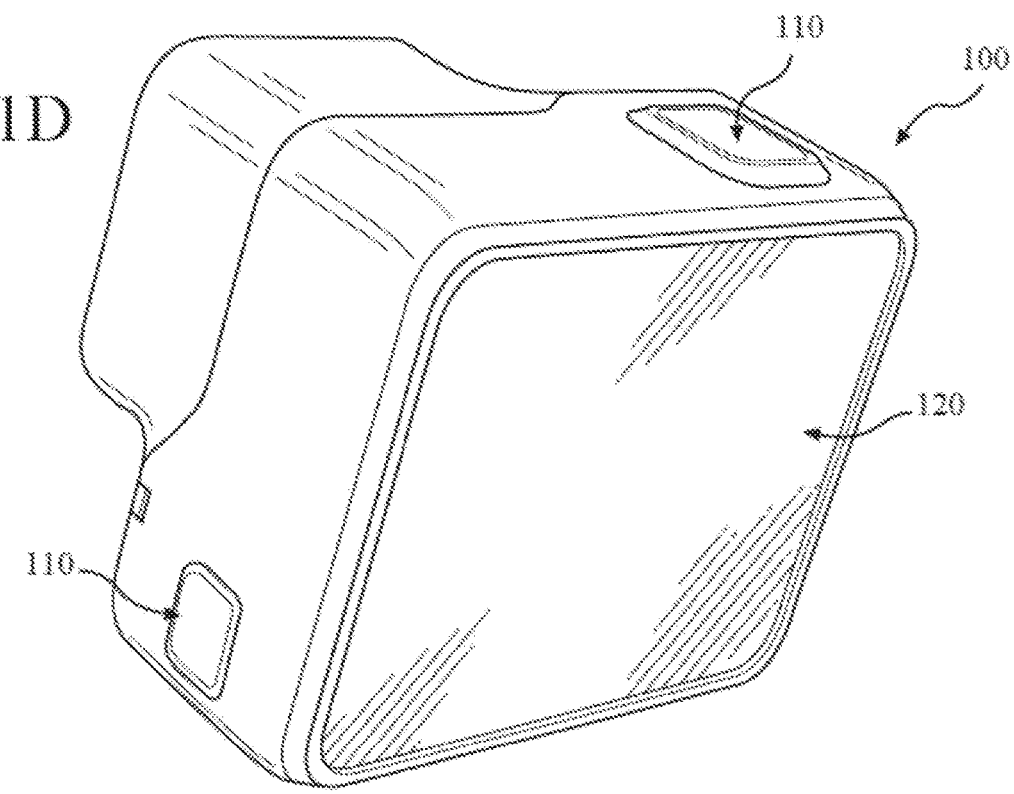

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115*a* (e.g., hidden as indicated using dotted lines) that is opened by engaging the associated button 110 as shown.

The removable door 115 can also be secured to the image capture device 100 using a hinge mechanism 115*b*, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115*a* and the hinge mechanism 115*b* allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
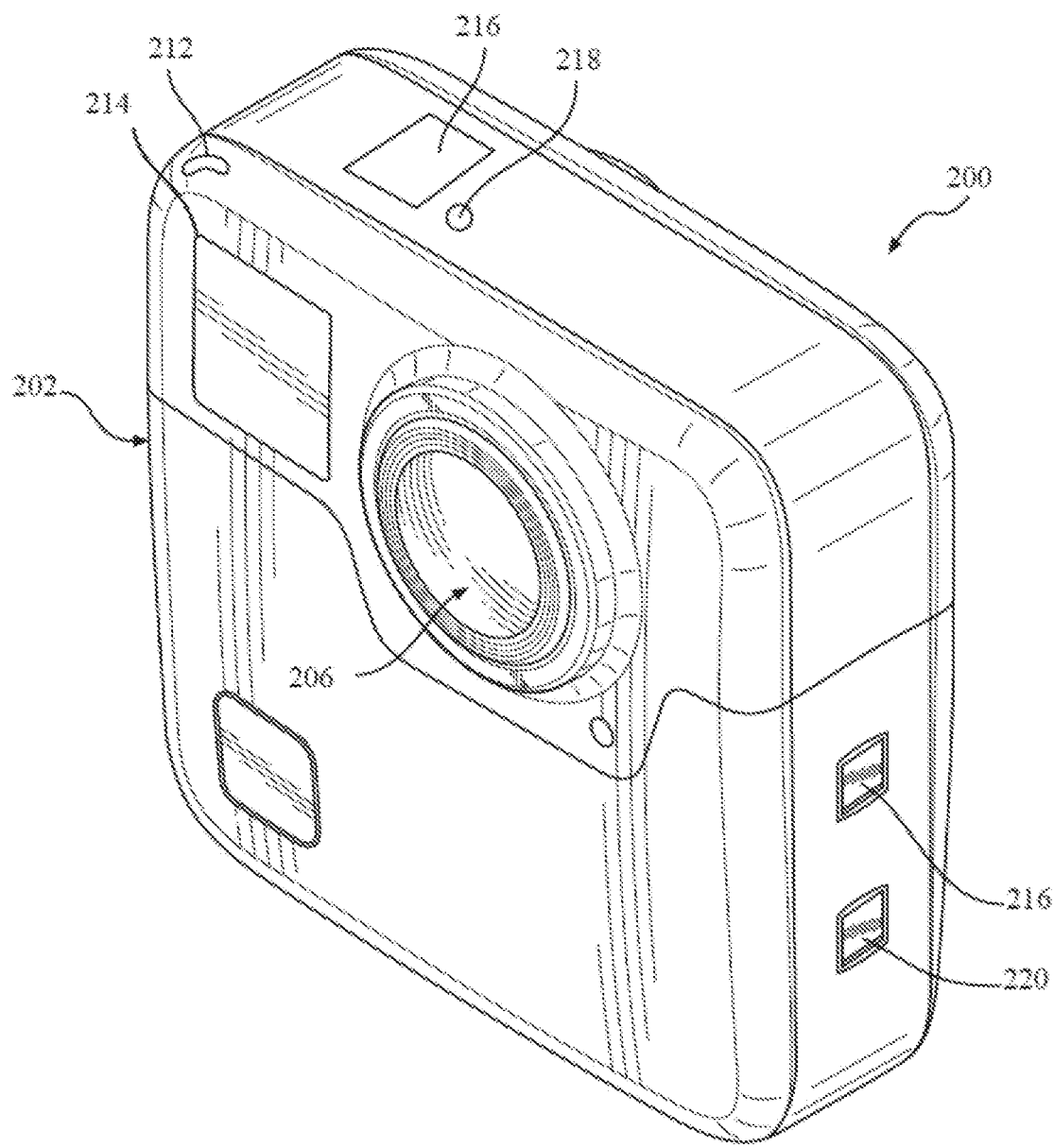
FIGS. 2A-B are isometric views of another example of an image capture device.
Figure 2B:
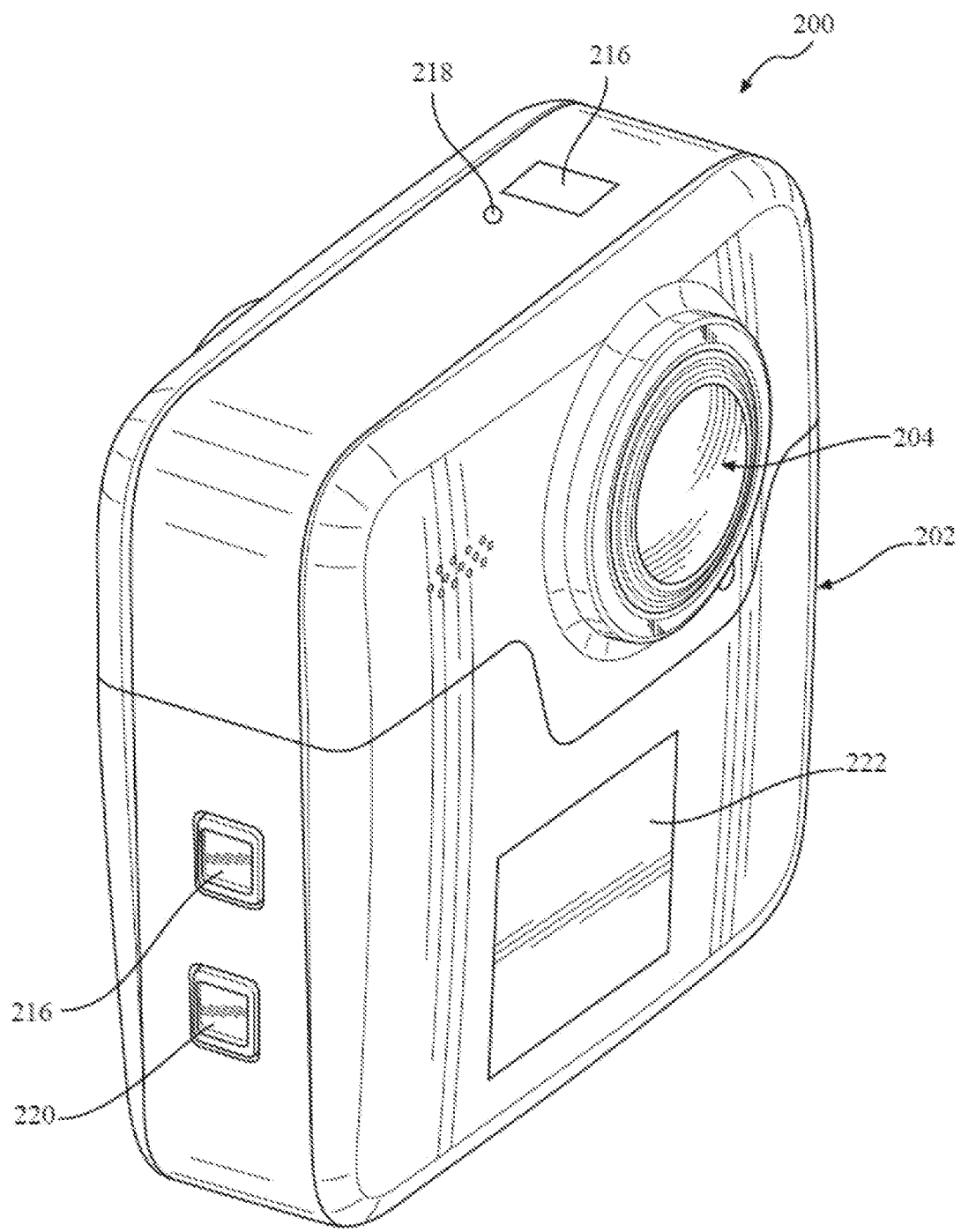

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
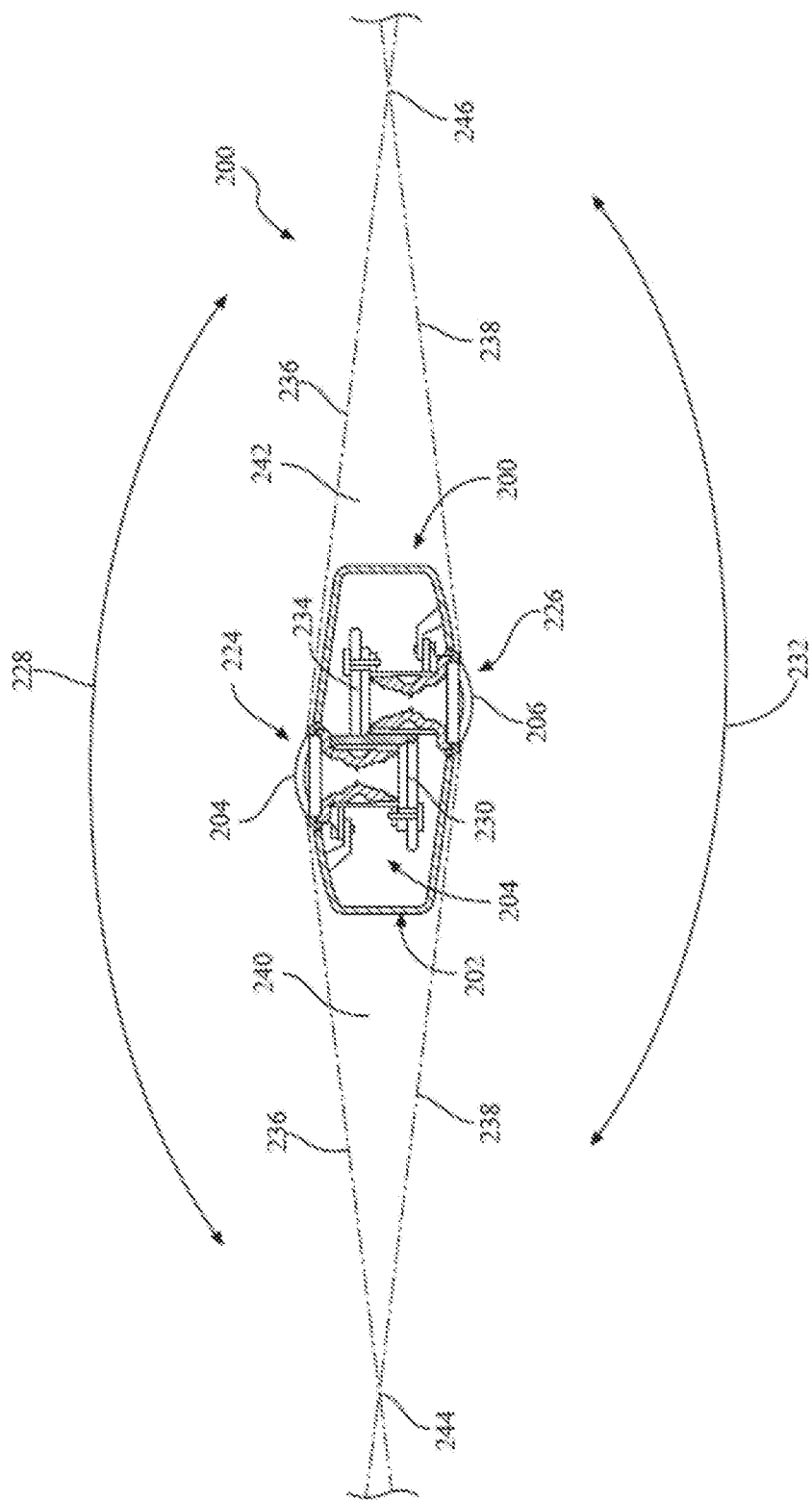
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 13:
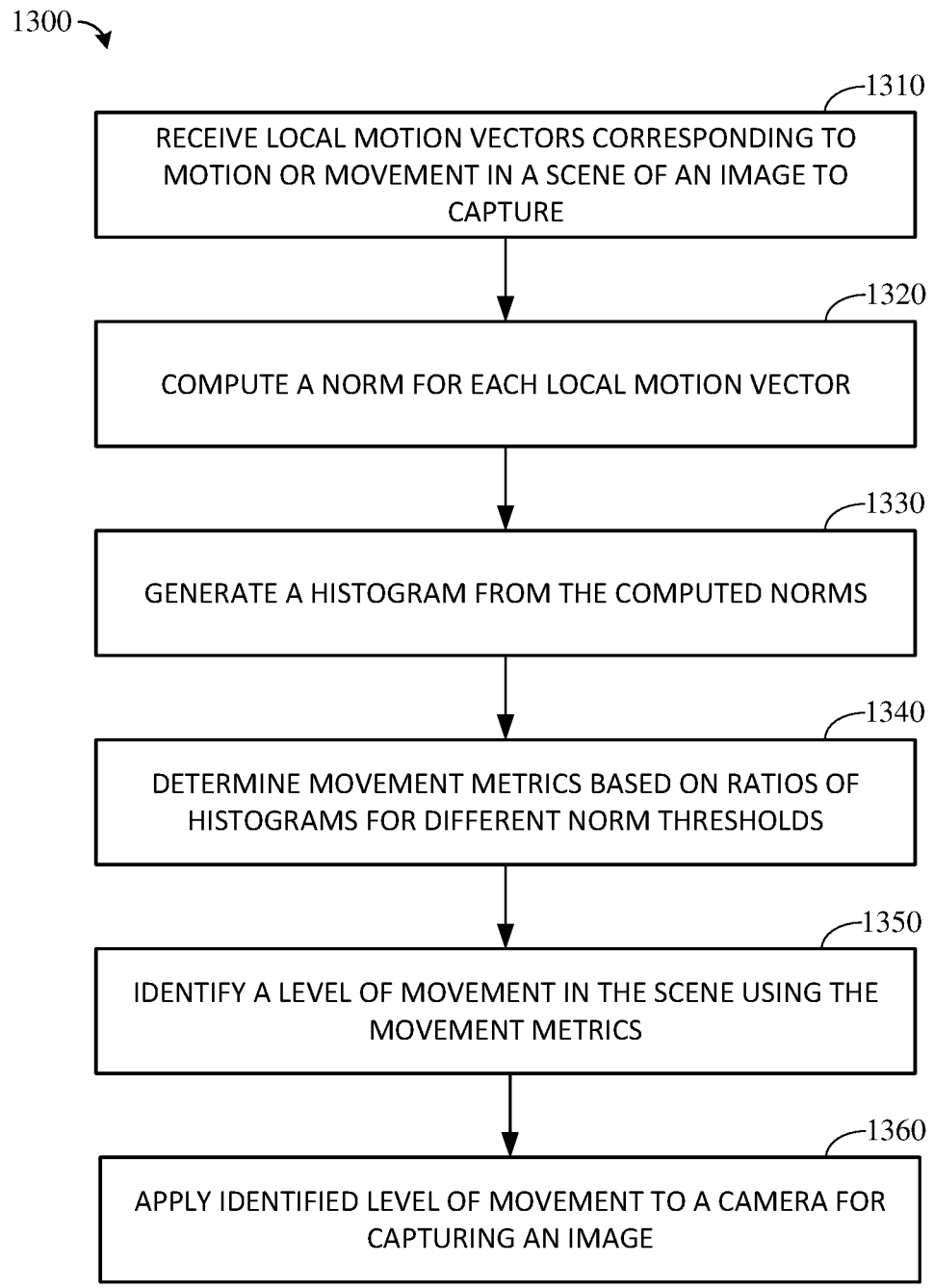
FIG. 13 is a flowchart showing an example of a technique for determining movement level in a scene using ratios of histograms which are based on local motion vectors.
Figure 14:
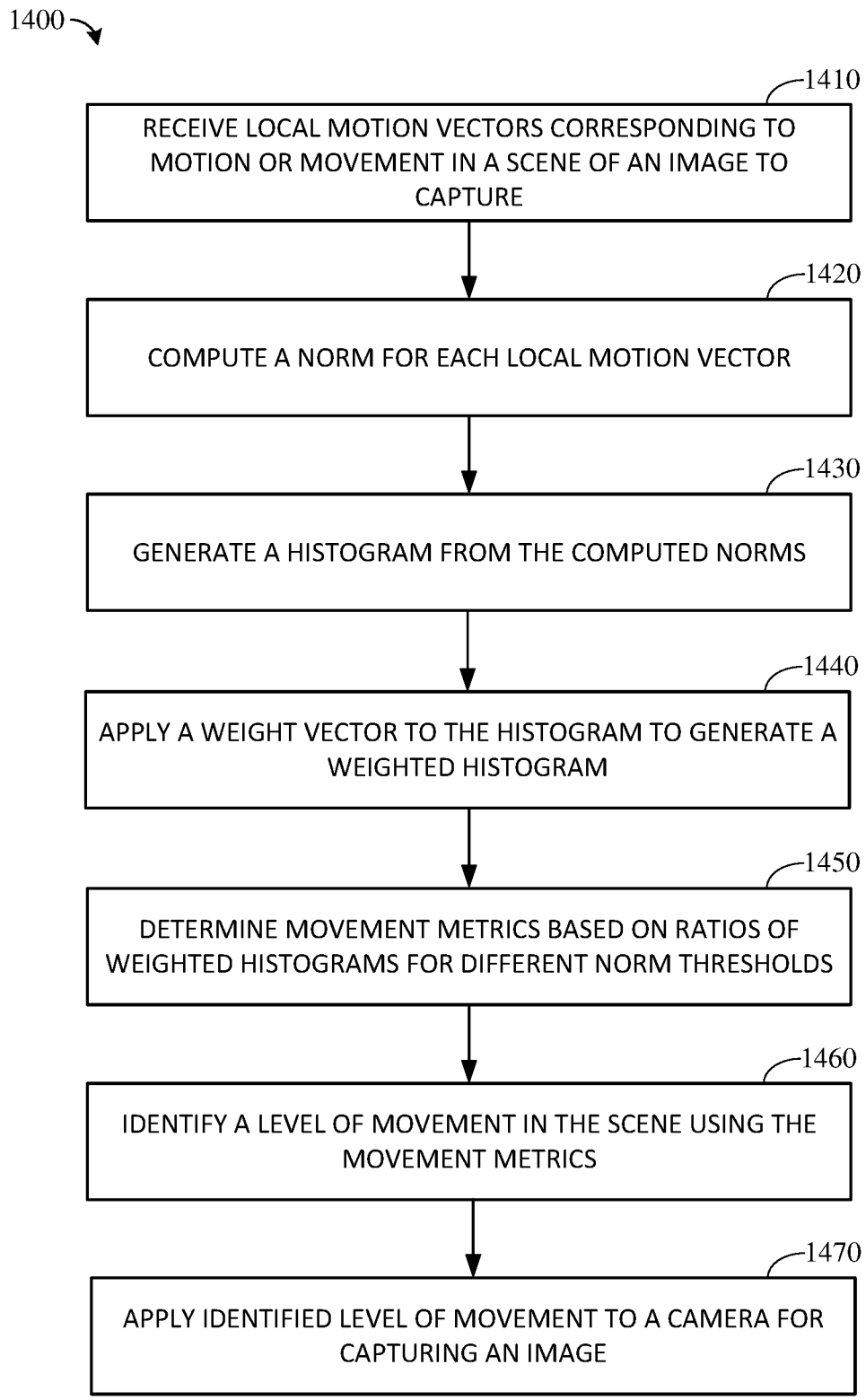
FIG. 14 is a flowchart showing an example of a technique for determining movement level in a scene using ratios of weighted histograms which are based on local motion vectors.
Figure 15:
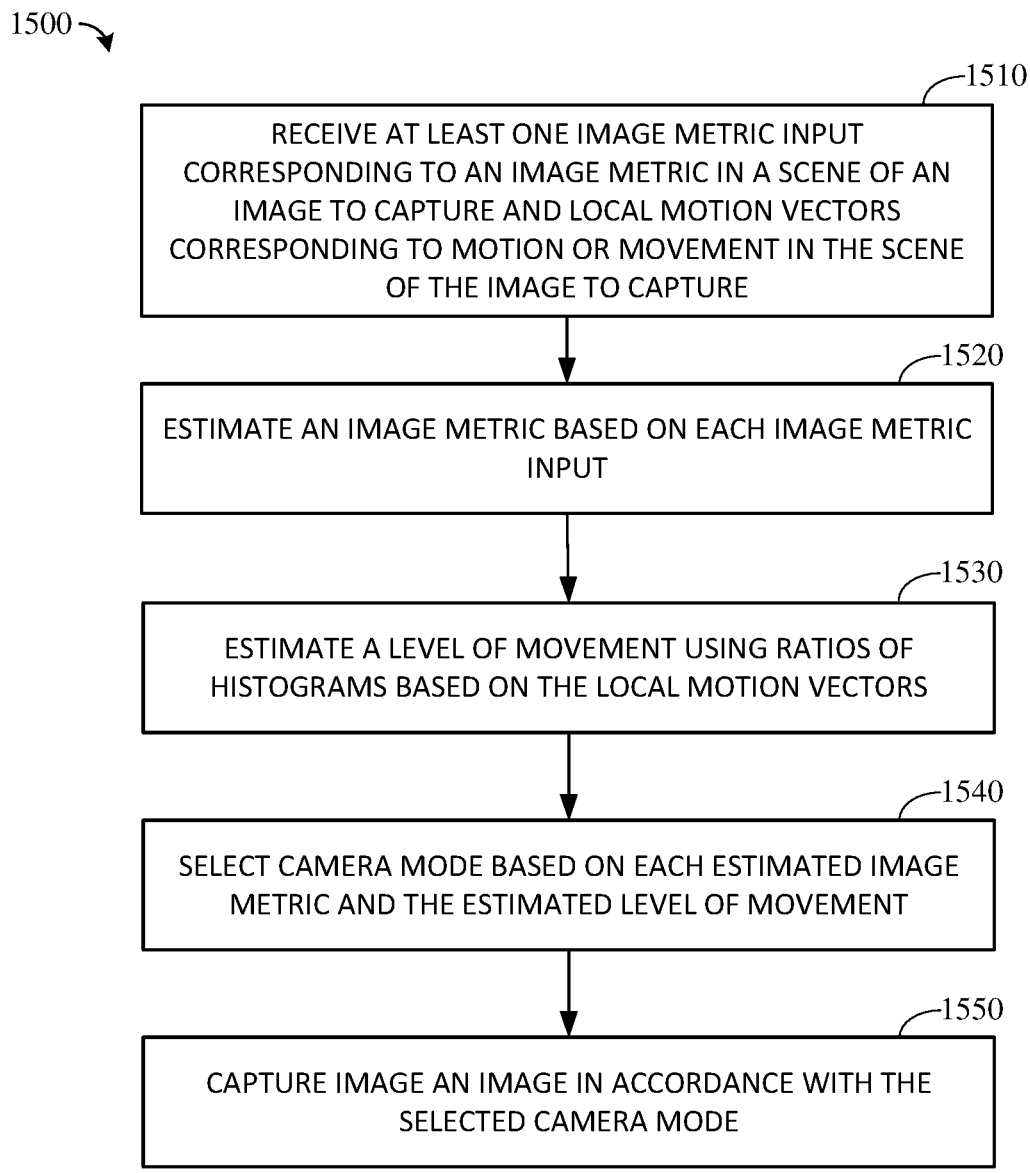
FIG. 15 is a flowchart showing an example of a technique for automated camera mode selection using ratios of histograms which are based on local motion vectors.

The image capture system 300 may be used to implement some or all of the techniques described in this disclosure, such as the technique for determining movement level in a scene using ratios of histograms based on local motion vectors as described in FIG. 13, the technique for determining movement level in a scene using ratios of weighted histograms based on local motion vectors as described in FIG. 14, and the technique for automated camera mode selection using ratios of histograms based on local motion vectors as described in FIG. 15.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the technique for determining movement level in a scene using ratios of histograms based on local motion vectors as described in FIG. 13, the technique for determining movement level in a scene using ratios of weighted histograms based on local motion vectors as described in FIG. 14, and the technique for automated camera mode selection using ratios of histograms based on local motion vectors as described in FIG. 15.

Figure 4B:
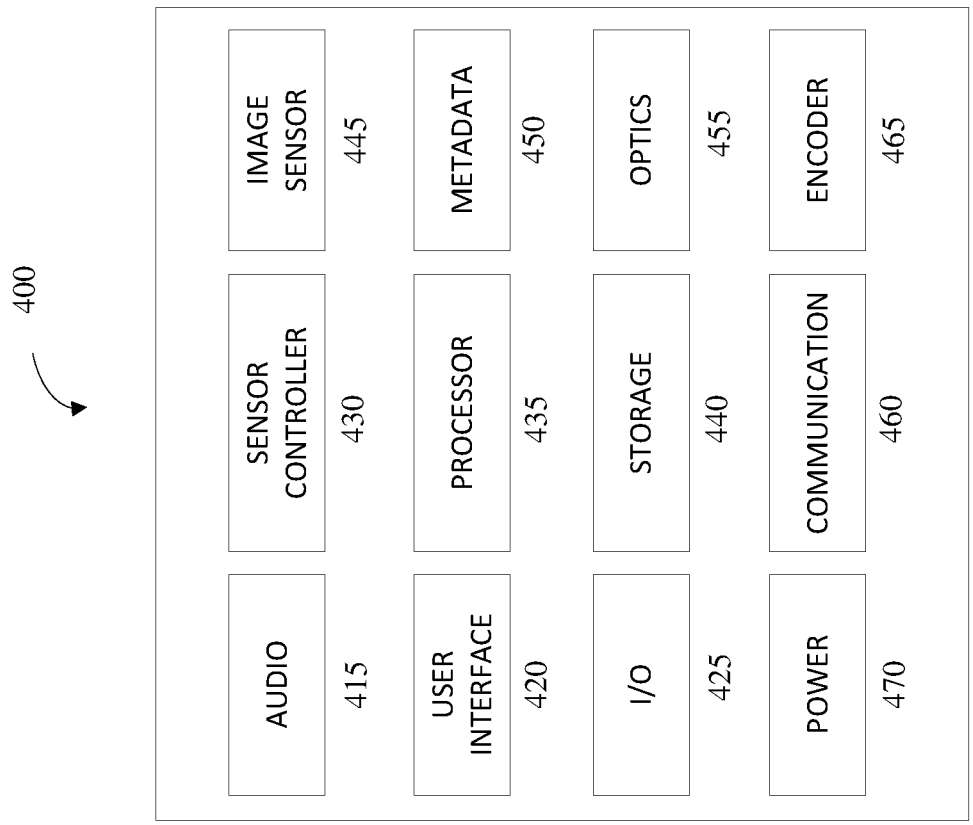
FIGS. 4A-B are a perspective view and a schematic representation of an image capture device.
Figure 4A:
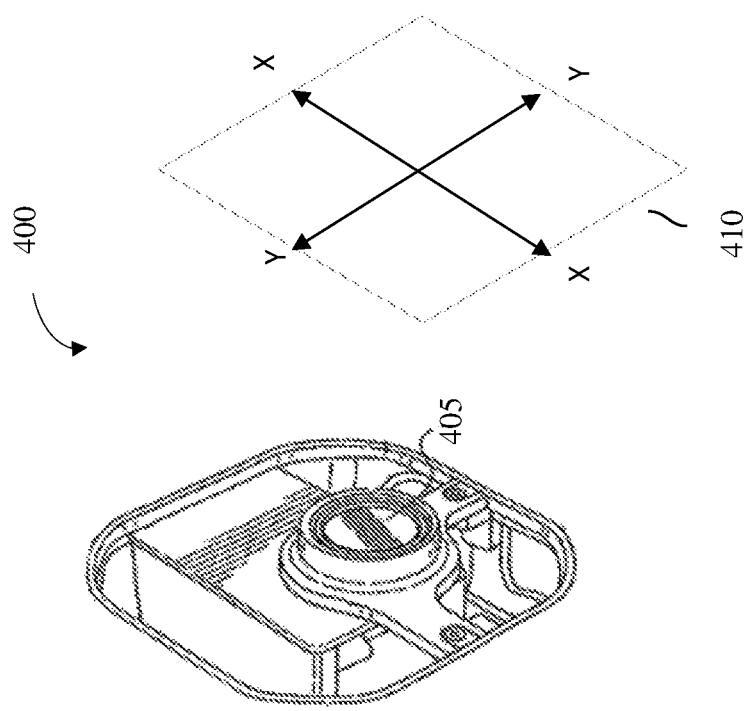

FIG. 4A is a perspective view of another example of an image capture device 400 together with an associated field-of-view and FIG. 4B is a schematic representation of the image capture device 400. The image capture device 400 includes one or more optical components or elements 405 with an associated field-of-view 410 that extends, for example, 90° in a lateral dimension X-X and 120° in a longitudinal dimension Y-Y. Dependent upon the capabilities of the particular optical component(s) 405, however, the extent of the field-of-view 410 may be varied (i.e., increased or decreased) in the lateral dimension or the longitudinal dimension. Suitable optical component(s) 405 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, spherical lenses, and perspective control lenses. In some image capture devices, multiple, overlapping fields of view are employed to increase the capability of the device, for example, by including two or more optical elements. For example, a first fisheye image may be a round or elliptical image, and may be transformed into a first rectangular image; a second fisheye image may be a round or elliptical image, and may be transformed into a second rectangular image; and the first and second rectangular images may be arranged side-by-side, which may include overlapping, and stitched together to form the equirectangular planar image.

As seen in FIG. 4A in addition to the optical component(s) 405, the image capture device 400 may further include an audio component 415, a user interface (UI) unit 420, an input/output (I/O) unit 425, a sensor controller 430, a processor 435, an electronic storage unit 440, an image sensor 445, a metadata unit 450, an optics unit 455, a communication unit 460, an encoder 465, and power system 470. Suitable examples of the image sensor 445 may include a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

During the processing of images, it is envisioned that the processor 435 may identify motion information, such as local motion vectors, representing motion between the respective images and reference data. The processor 435 may implement some or all of the techniques described in this disclosure, such as the technique for determining movement level in a scene using ratios of histograms based on local motion vectors as described in FIG. 13, the technique for determining movement level in a scene using ratios of weighted histograms based on local motion vectors as described in FIG. 14, and the technique for automated camera mode selection using ratios of histograms based on local motion vectors as described in FIG. 15.

Figure 5:
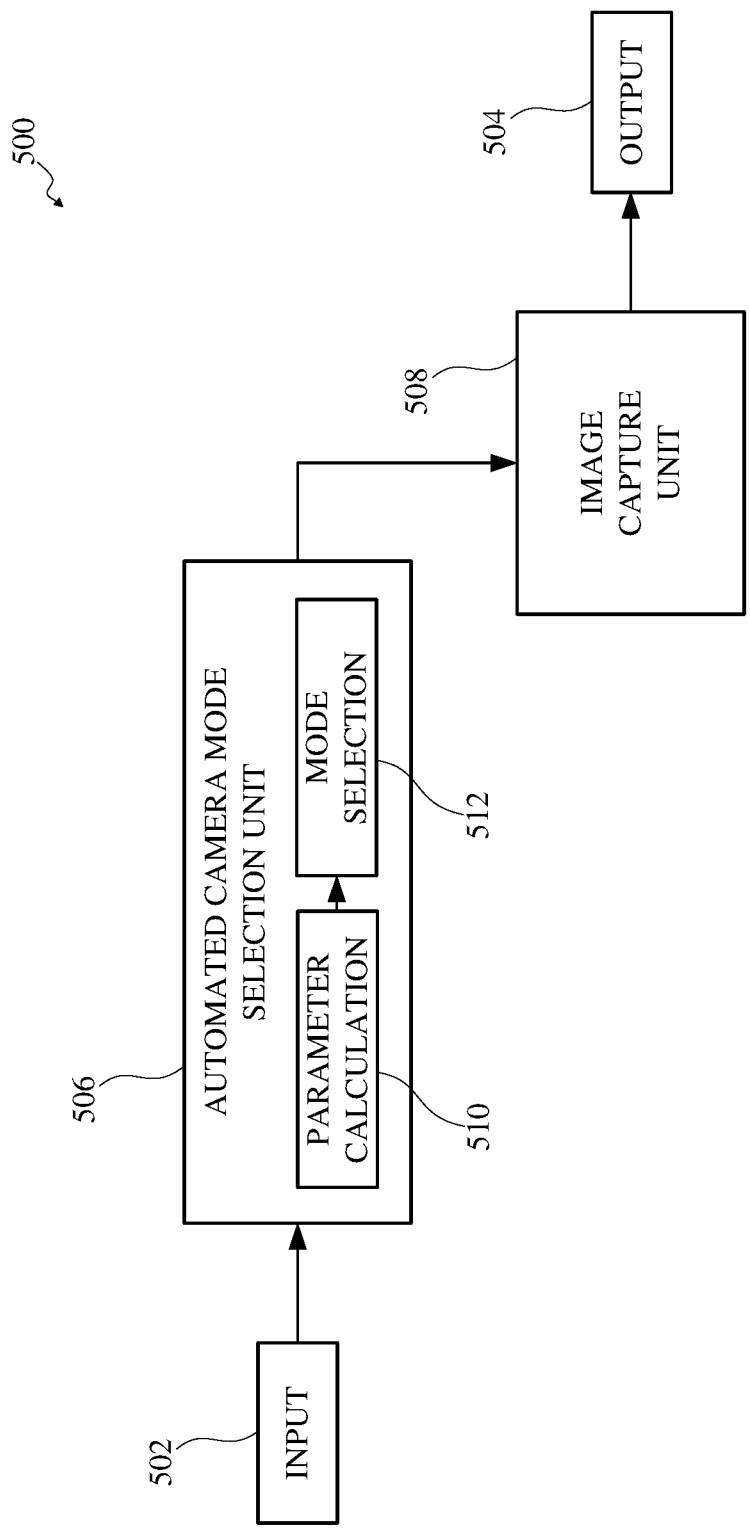
FIG. 5 is a block diagram of an example of an automated camera mode selection and capture pipeline.

FIG. 5 is a block diagram of an example of an automated camera mode selection and capture pipeline 500. In some implementations, the automated camera mode selection and capture pipeline 400 may be included in an image capture device, such as the image capture device 100 shown in FIGS. 1A-D, the image capture device 200 shown in FIGS. 2A-C, the image capture device 310 shown in FIG. 3A, or the image capture device 340 shown in FIG. 3B. In some implementations, the automated camera mode selection and capture pipeline 500 may represent functionality of an integrated circuit, for example, including an image capture unit, an automated camera mode selection unit, or a combined automated camera mode selection and image capture unit.

The automated camera mode selection and capture pipeline 500 receives input 502 and processes the input 502 to produce output 504. The input 502 may be information or measurements usable to select a camera mode at an automated camera mode selection unit 506. For example, the input 502 may include measurements related to criteria processed by the automated camera mode selection unit 506, such as dynamic range, motion, light intensity, and/or the like. The input 502 may be received using one or more sensors of the image capture device or processor implementing the camera mode selection and capture pipeline 500.

The output 504 may be an image captured using an image capture unit 508. The image capture unit 508 uses the camera mode selected by the automated camera mode selection unit 506 to capture an image, such as using an image sensor (e.g., the first image sensor 314 and/or the second image sensor 316, the image sensor 342, or the image sensor 445). For example, the image captured using the image capture unit 508 may be an image or a frame of a video. That image or frame may be one of a sequence or series of images or frames of a video, such as a sequence, or series, of frames captured at a rate, or frame rate, which may be a number or cardinality of frames captured per defined temporal period, such as twenty-four, thirty, or sixty frames per second. The output 504 may be output for display at the image capture device and/or transmitted to another component or device.

The automated camera mode selection unit 506 includes a parameter calculation unit 510 and a mode selection unit 512. The parameter calculation unit 510 processes the input 502 to determine values for the image selection criteria represented within the input 502. The parameter calculation unit 510 outputs those values or data indicative thereof to the mode selection unit 512. The mode selection unit 512 selects a camera mode to use to capture an image based on those values or data.

In some implementations, the automated camera mode selection unit 506 may include additional units or functionality. In some implementations, the parameter calculation unit 510 and the mode selection unit 512 may be combined into one unit. In some implementations, aspects of one or both of the parameter calculation unit 510 or the mode selection unit 512 may be separated into multiple units.

Figure 6:
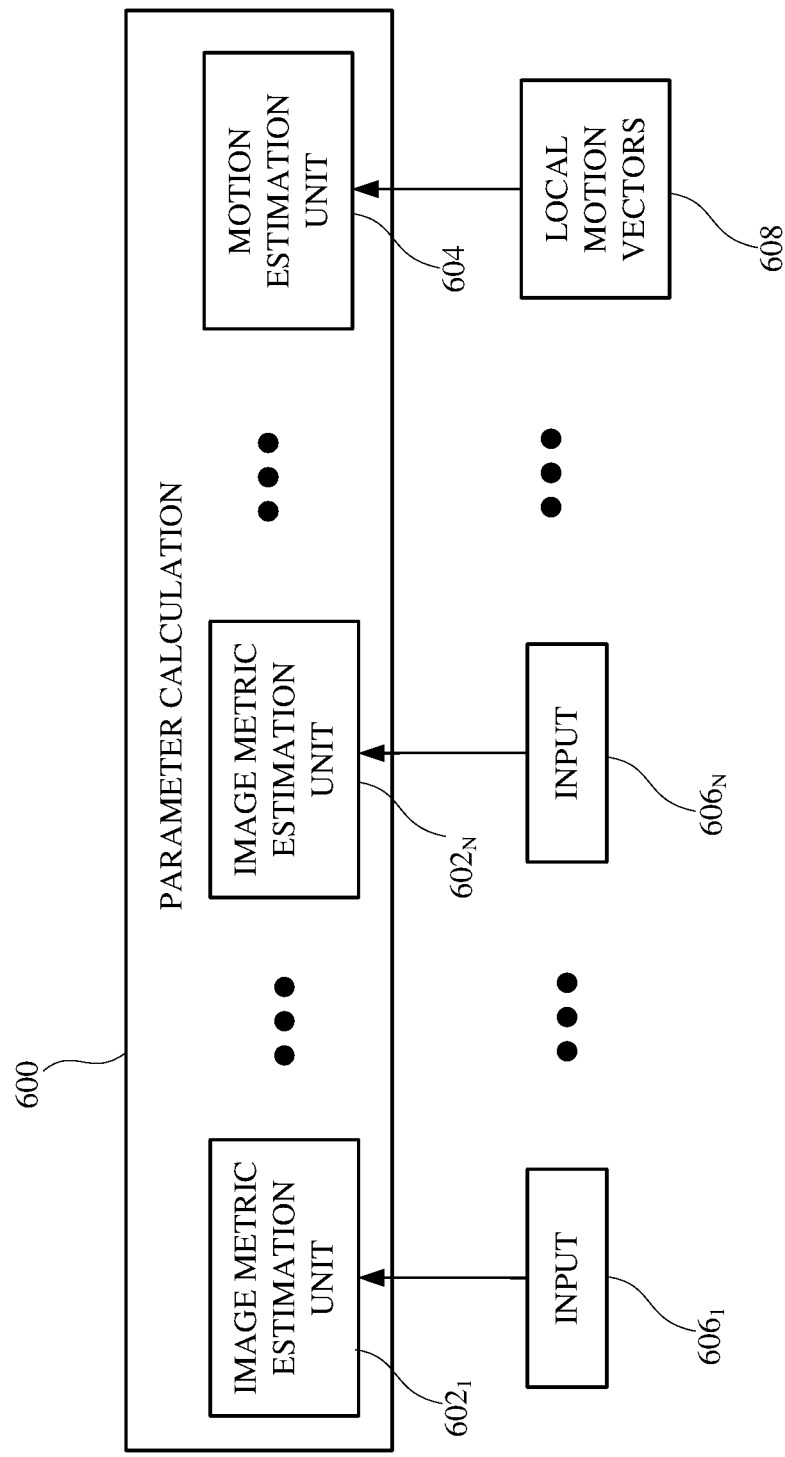
FIG. 6 is a block diagram of an example of a parameter calculation unit of an automated camera mode selection unit of an image capture device.

FIG. 6 is a block diagram of an example of a parameter calculation unit 600 of an automated camera mode selection unit of an image capture device. For example, the parameter calculation unit 600 may be the parameter calculation unit 510 of the pipeline 500 described with respect to FIG. 5. The parameter calculation unit 600 includes a plurality of image metric estimation units $602_1, \ldots, 602_N$ including a motion estimation unit 604. The plurality of image metric estimation units $602_1, \ldots, 602_N$ each may estimate an image metric, such as dynamic range, light intensity, or the like, for an image to be captured using inputs $606_1, \ldots, 606_N$. The motion estimation unit 604 may estimate motion or movement for the image to be captured using local motion vectors as an input 608. In an implementation, the motion estimation unit 604 may use ratios of the histograms based on the local motion vectors to determine all, medium, or big levels of movement in the scene. In an implementation, the motion estimation unit 604 may use ratios of weighted histograms based on the local motion vectors to determine all, medium, or strong levels of movement in the scene. Some or all of the inputs $606_1, \ldots, 606_N$ and/or the input 608 may be included within the input received at the automated camera mode selection unit that implements the parameter calculation unit 600. For example, some or all of the inputs $606_1, \ldots, 606_N$ or the input 608 may be received within the input 502 described with respect to FIG. 5. In some implementations, some or all of the inputs $606_1, \ldots, 606_N$ or the input 608 may refer to the same or similar information or measurements.

The motion estimation unit 604 may use the input 608 to determine a level or amount of movement in a scene. In an implementation, the local motion vectors may be provided by an image signal processing pipeline implemented in, for example, the processing apparatus 312, and/or the processor 435. The local motion vectors are two-dimensional vector fields (e.g., an x component and y component of motion) which may indicate the motion in a scene. For example, each vector may indicate the motion of a block of pixels between two frames of a video. Each local motion vector may range from −16 to 16 in width and −12 to 12 in height, for example. In an implementation, the local motion vectors may use different ranges.

In an implementation, the motion estimation unit 604 may use ratios of the histograms based on the local motion vectors to determine all, medium, or big levels of movement in the scene. In an implementation, the motion estimation unit 604 may use ratios of weighted histograms based on the local motion vectors to determine all, medium, or strong levels of movement in the scene.

In an implementation, the motion estimation unit 604 may compute norms for each of the local motion vectors and generate a histogram (H) using the norms. In an implementation, the histogram may have a defined number of bins. In an implementation, movement metrics (M) may be determined which reflect all the movements, all the medium movements, and all the big movements in the scene of an image to capture. In an implementation, a movement corresponding to a local motion vector with a norm above 1 may be defined as a small movement metric. In an implementation, a movement corresponding to a local motion vector with a norm above 2 may be defined as a medium movement metric. In an implementation, a movement corresponding to a local motion vector with a norm above 10 may be defined as a big movement metric. The movement metrics may be defined using different norm thresholds without departing from the scope of the claims and/or specification. Each movement metric may be defined by a ratio of a summation of histogram bins meeting or exceeding the specified norm threshold divided by a summation of all of the histogram bins. In an implementation, the movement metrics are computed as:

$$M_{all} = \frac{\sum_{n=1}^{N_{bins}-1} H[n]}{\sum_{n=0}^{N_{bins}-1} H[n]} \qquad \text{Equation 1}$$

$$M_{medium} = \frac{\sum_{n=2}^{N_{bins}-1} H[n]}{\sum_{n=0}^{N_{bins}-1} H[n]} \qquad \text{Equation 2}$$

$$M_{big} = \frac{\sum_{n=1}^{N_{bins}-1} H[n]}{\sum_{n=10}^{N_{bins}-1} H[n]} \qquad \text{Equation 3}$$

In an implementation, sensitivity to medium and/or big movements, i.e., movement with a higher speed, may be increased by giving more weight to local motion vectors which have higher norms. In an implementation, sensitivity may be increased by multiplying the histogram H by a weight vector (W):

$$H_W = H \times W \qquad \text{Equation 4}$$

where, in an implementation, W may be defined as:

$$W = \begin{cases} 1 & \text{if } i < 2 \\ 2 & \text{if } i \in [2, 4] \\ 3 & \text{if } i \in [5, 10] \\ 4 & \text{if } i > 10 \end{cases} \qquad \text{Equation 5}$$

W may be defined using different thresholds without departing from the scope of the claims and/or specification.

In an implementation, the motion estimation unit 604 may implement the techniques of FIGS. 13 and 14 to determine all, medium, or strong levels of movement in the scene using histograms based on the local motion vectors. In an implementation, the determination from the motion estimation unit 604 may be used to automatically select a camera mode to use for capturing the image as described with respect to FIG. 15. In an implementation, the determination from the motion estimation unit 604 along with one or more of outputs of the plurality of image metric estimation units $602_1, \ldots, 602_N$ may be used to automatically select a camera mode to use for capturing the image.

FIGS. 7A-12B are graphs of movement metrics for all frames in a video determined using the ratios of histograms which are based on local motion vectors and ratios of weighted histograms which are based on local motion vectors.

Figures 7A, 7B:
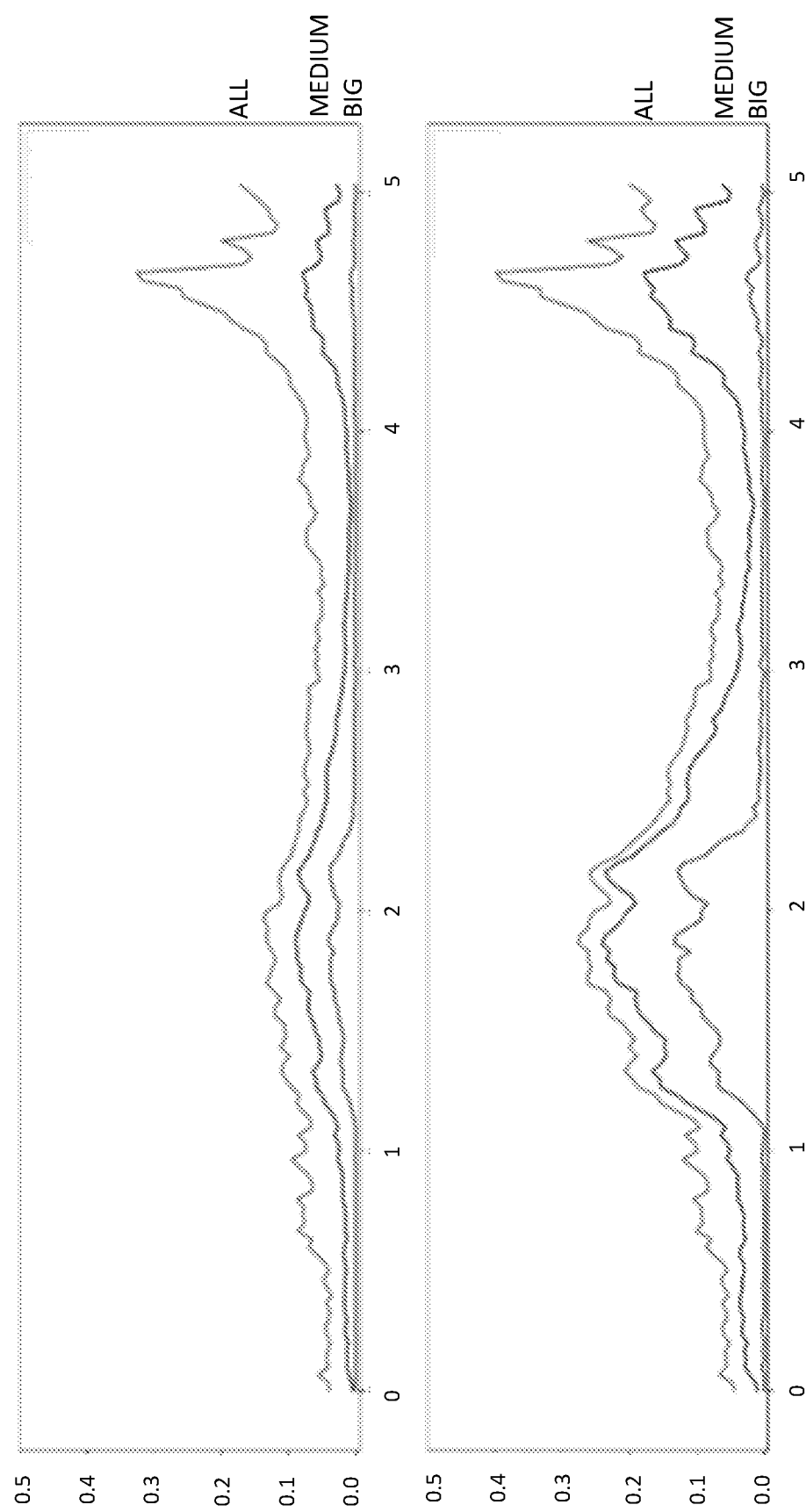

FIGS. 7A and 7B show movement metrics for a video taken with a static camera with motion in the scene. In particular, there is a car moving from left to right from 1 to 3 seconds and pedestrians crossing a road from 4 to 5 seconds.

FIGS. 8A and 8B show movement metrics for a video taken with a static camera with motion in the scene. In particular, there are pedestrians crossing the road and cars in the background. Although the movement metrics stay low throughout the video, as the pedestrians move toward the camera (toward the end of the video), the movement metrics start to rise.

FIGS. 9A and 9B show movement metrics for a video taken with a slightly moving camera with motion in the scene. In particular, a car leaves the field of view in the beginning of the video and another enters and then leaves the field of view.

Figures 10A, 10B:
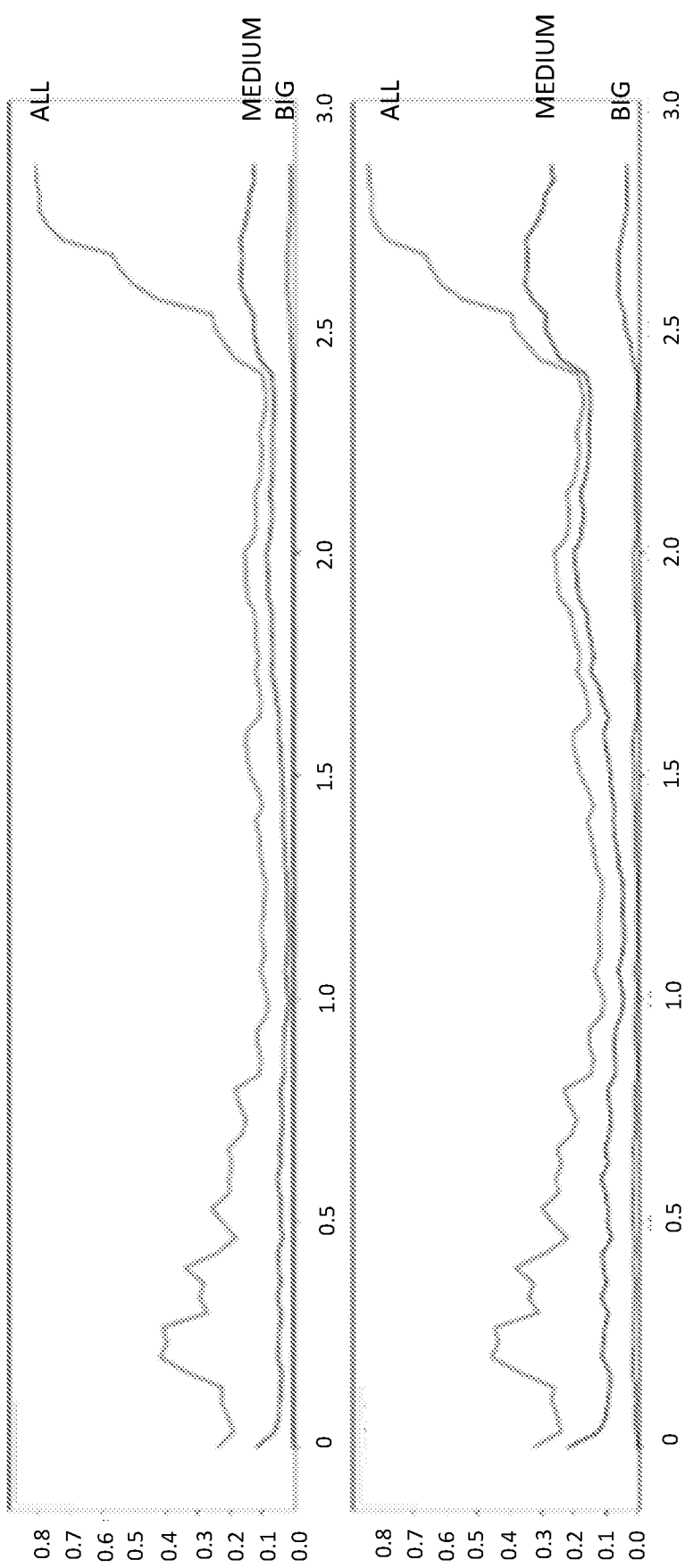

FIGS. 10A and 10B show movement metrics for a video taken with a camera that is moving slightly in the beginning and with motion in the scene. In particular, a pedestrian is walking slowly at the beginning and then quicker at the end.

Figures 11A, 11B:
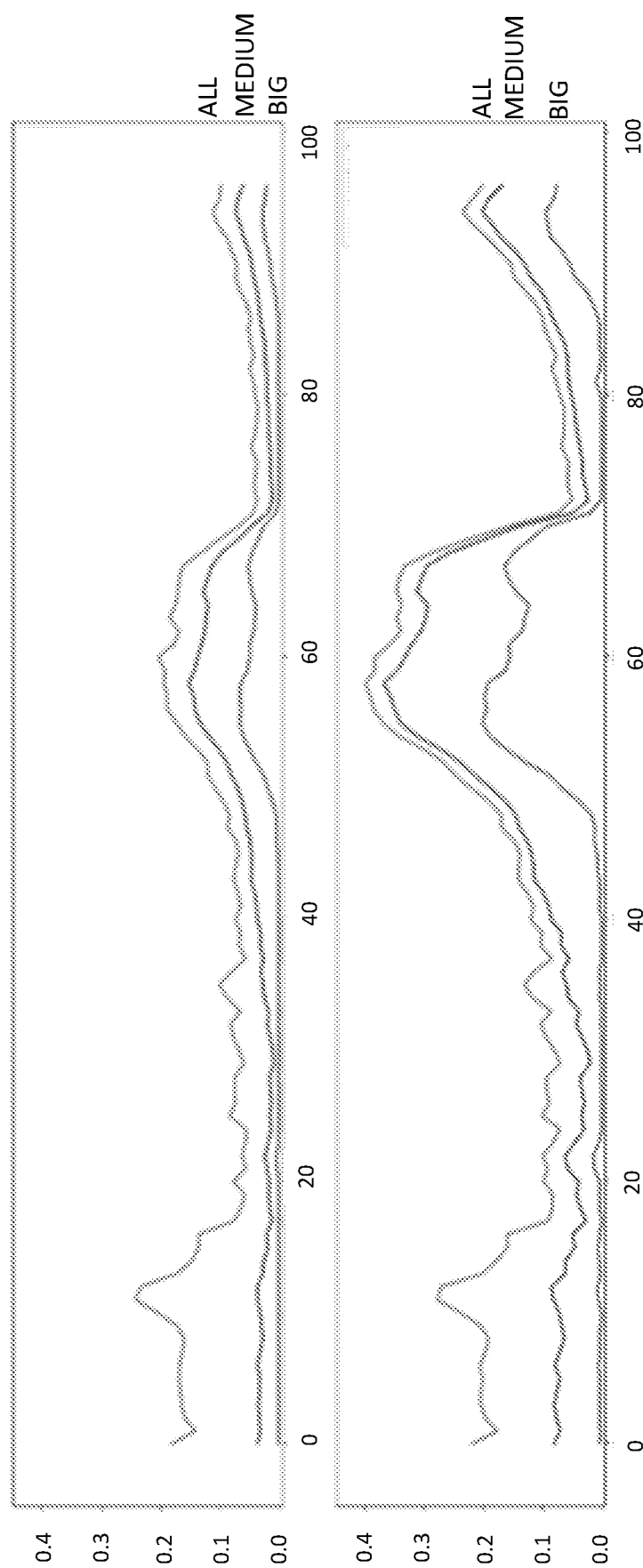

FIGS. 11A and 11B show movement metrics for a video taken with a camera that is moving slightly in the beginning and with motion in the scene. In particular, a car arrives towards the camera and then leaves the field of view.

FIGS. 12A and 12B show movement metrics for a video taken with a camera that is moving. In particular, there is no motion in the foreground and cars moving in the background.

Each pair of FIGS. 7A-12B illustrate, as expected, that the use of the weights increases the impact of the medium and big movements. As a result, the medium and big movements are easier to detect. In general, the medium and big movements describe the movement of objects in the foreground of the video and the objects moving in the background are almost not detectable. Any small movements are present only when the camera is moving. It is noted that when the user is walking while taking a picture, the local motion vectors do not describe the movement in the scene, but the overall difference between two successive frames.

FIG. 13 is a flowchart showing an example of a technique 1300 for determining movement levels in a scene using ratios of histograms which are based on local motion vectors. The technique 1300 includes receiving 1310 local motion vectors corresponding to motion or movement in a scene of an image to capture; computing 1320 a norm for each local motion vector; generating 1330 a histogram from the computed norms; determining 1340 movement metrics based on ratios of the histograms for different norm thresholds; identifying 1350 a level of movement in the scene based on the movement metrics; and applying 1360 identified level of movement to a camera for capturing an image.

The technique 1300 includes receiving 1310 local motion vectors corresponding to motion or movement in a scene of an image to capture. In an implementation, the local motion vectors may be provided by an image signal processing pipeline. In an implementation, the local motion vectors are two-dimensional vector fields, where each vector may indicate the motion of a block of pixels between two frames of a video. Each local motion vector may range from −16 to 16 in width and −12 to 12 in height, for example. In an implementation, the local motion vectors may use different ranges.

The technique 1300 includes computing 1320 a norm for each local motion vector. In an implementation, the norm may be the square root of the sum of the squared vector values in the local motion vector. In an implementation, other techniques may be used to compute the norm of the local motion vector.

The technique 1300 includes generating 1330 a histogram from the computed norms. In an implementation, the histogram may have a defined number of bins. In an implementation, the number of bins is twenty.

The technique 1300 includes determining 1340 movement metrics based on ratios of histograms for different norm thresholds. In an implementation, the determining 1340 includes determining a movement metric for all movements. The movement metric for all movements may be determined by using a norm threshold set to 1 and computing a ratio between 1) all bins meeting or exceeding the norm threshold of 1 and 2) all bins. In an implementation, the determining 1340 includes determining a movement metric for all medium movements. The movement metric for all medium movements may be determined by using a norm threshold set to 2 and computing a ratio between 1) all bins meeting or exceeding the norm threshold of 2 and 2) all bins. In an implementation, the determining 1340 includes determining a movement metric for all big movements. The movement metric for all big movements may be determined by using a norm threshold set to 10 and computing a ratio between 1) all bins meeting or exceeding the norm threshold of 10 and 2) all bins.

The technique 1300 includes identifying 1350 a level of movement in the scene based on the movement metrics. The level of movement may be determined from the values of the ratios of each of the movement metrics.

The technique 1300 includes applying 1360 identified level of movement to a camera for capturing an image. In an implementation, the identified level of movement may be used to automatically set a camera capture mode.

FIG. 14 is a flowchart showing an example of a technique 1400 for determining movement level in a scene using ratios of weighted histograms which are based on local motion vectors. The technique 1400 includes receiving 1410 local motion vectors corresponding to motion or movement in a scene of an image to capture; computing 1420 a norm for each local motion vector; generating 1430 a histogram from the computed norms; applying 1440 a weight vector to the histogram to generate a weighted histogram; determining 1450 movement metrics based on ratios of the weighted histograms for different norm thresholds; identifying 1460 a level of movement in the scene based on the movement metrics; and applying 1470 identified level of movement to a camera for capturing an image.

The technique 1400 includes receiving 1410 local motion vectors corresponding to motion or movement in a scene of an image to capture. In an implementation, the local motion vectors may be provided by an image signal processing pipeline. In an implementation, the local motion vectors are two-dimensional vector fields, where each vector may indicate the motion of a block of pixels between two frames of a video. Each local motion vector may range from −16 to 16 in width and −12 to 12 in height, for example. In an implementation, the local motion vectors may use different ranges.

The technique 1400 includes computing 1420 a norm for each local motion vector. In an implementation, the norm may be the square root of the sum of the squared vector values in the local motion vector. In an implementation, other techniques may be used to compute the norm of the local motion vector.

The technique 1400 includes generating 1430 a histogram from the computed norms. In an implementation, the histogram may have a defined number of bins. In an implementation, the number of bins is twenty.

The technique 1400 includes applying 1440 a weight vector to the histogram to generate a weighted histogram. In an implementation, the weight vector may emphasize or favor medium and big movements. In an implementation, the weight vector may have multiple weights where increasingly higher valued norms of the local motion vectors may be multiplied by increasingly higher weights. In an implementation, the weight vector may have a unitary weight for a norm of 1 and non-unitary weight for norms greater than 1.

The technique 1400 includes determining 1450 movement metrics based on ratios of the weighted histograms for different norm thresholds. In an implementation, the determining 1340 includes determining a movement metric for all movements. The movement metric for all movements may be determined by using a norm threshold set to 1 and computing a ratio between 1) all bins meeting or exceeding the norm threshold of 1 and 2) all bins. In an implementation, the determining 1340 includes determining a movement metric for all medium movements. The movement metric for all medium movements may be determined by using a norm threshold set to 2 and computing a ratio between 1) all bins meeting or exceeding the norm threshold of 2 and 2) all bins. In an implementation, the determining 1340 includes determining a movement metric for all big movements. The movement metric for all big movements may be determined by using a norm threshold set to 10 and computing a ratio between 1) all bins meeting or exceeding the norm threshold of 10 and 2) all bins.

The technique 1400 includes identifying 1460 a level of movement in the scene based on the movement metrics. The level of movement may be determined from the values of the ratios of each of the movement metrics.

The technique 1400 includes applying 1470 identified level of movement to a camera for capturing an image. In an implementation, the identified level of movement may be used to automatically set a camera capture mode.

FIG. 15 is a flowchart showing an example of a technique 1500 for automated camera mode selection using ratios of histograms which are based on local motion vectors. The technique 1500 includes receiving 1510 at least one image metric input corresponding to an image metric in a scene of an image to capture and local motion vectors corresponding to motion or movement in the scene of the image to capture; estimating 1520 an image metric based on each image metric input; estimating 1530 a level of movement using ratios of histograms based on the local motion vectors; selecting 1540 a camera mode based on each estimated image metric and the estimated level of movement; and capturing 1550 an image in accordance with the selected camera mode.

The technique 1500 includes receiving 1510 at least one image metric input corresponding to an image metric in a scene of an image to capture and local motion vectors corresponding to motion or movement in the scene of the image to capture. In an implementation, the at least one image metric input may be dynamic range inputs. In an implementation, the at least one image metric input may be light intensity inputs. In an implementation, the local motion vectors may be provided by an image signal processing pipeline. In an implementation, the local motion vectors are two-dimensional vector fields, where each vector may indicate the motion of a block of pixels between two frames of a video. Each local motion vector may range from −16 to 16 in width and −12 to 12 in height, for example. In an implementation, the local motion vectors may use different ranges.

The technique 1500 includes estimating 1520 an image metric based on each image metric input. In an implementation, an estimate of high dynamic range (HDR) may be determined from the at least one image metric input. In an implementation, an estimate of light intensity may be determined from the at least one image metric input.

The technique 1500 includes estimating 1530 a level of movement using ratios of histograms based on the local motion vectors. In an implementation, the estimating 1530 includes computing a norm for each local motion vector. In an implementation, the norm may be the square root of the sum of the squared vector values in the local motion vector. In an implementation, other techniques may be used to compute the norm of the local motion vector. In an implementation, the estimating 1530 includes generating a histogram from the computed norms. In an implementation, the histogram may have a defined number of bins. In an implementation, the number of bins is twenty. In an implementation, the estimating 1530 includes determining movement metrics based on ratios of histograms for different norm thresholds. In an implementation, the estimating 1530 applying a weight vector to the histogram to generate a weighted histogram. In an implementation, the weight vector may emphasize or favor medium and big movements. In an implementation, the weight vector may have multiple weights where increasingly higher valued norms of the local motion vectors may be multiplied by increasingly higher weights. In an implementation, the weight vector may have a unitary weight for a norm of 1 and non-unitary weight for norms greater than 1. In an implementation, the estimating 1530 includes determining a movement metric for all movements. The movement metric for all movements may be determined by using a norm threshold set to 1 and computing a ratio between 1) all bins meeting or exceeding the norm threshold of 1 and 2) all bins. In an implementation, the determining 1340 includes determining a movement metric for all medium movements. The movement metric for all medium movements may be determined by using a norm threshold set to 2 and computing a ratio between 1) all bins meeting or exceeding the norm threshold of 2 and 2) all bins. In an implementation, the determining 1340 includes determining a movement metric for all big movements. The movement metric for all big movements may be determined by using a norm threshold set to 10 and computing a ratio between 1) all bins meeting or exceeding the norm threshold of 10 and 2) all bins. In an implementation, the estimating 1530 includes identifying a level of movement in the scene based on the movement metrics. The level of movement may be determined from the values of the ratios of each of the movement metrics.

The technique 1500 includes selecting 1540 a camera mode based on each estimated image metric and the estimated level of movement. In an implementation, a camera mode may be selected based on a combination of each estimated image metric and the estimated level of movement. Different combinations may lead to different camera mode selections.

The technique 1500 includes capturing 1550 an image in accordance with the selected camera mode. Capturing an image using the selected camera mode can include adjusting settings of an image capture device according to configurations of the selected camera mode.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device with automated image acquisition mode selection, the image capture device comprising:
   one or more image metric estimation units configured to detect a presence or level of an image metric in a scene of an image to capture based on one or more image metric inputs;
   a motion estimation unit configured to:
      compute norms, a norm corresponding to a local motion vector;
      generate a data bin from the computed norms, the data bin including bins;
      determine different movement metrics based on computing different ratios of all bins in the data bin associated with different norm thresholds and all bins in the data bin; and
      determine a level of movement within the scene based on the determined different movement metrics;
   a mode selection unit configured to select a camera mode to use for capturing the image based on outputs of the one or more image metric estimation units and the motion estimation unit; and
   an image sensor configured to capture the image according to the selected camera mode.

2. The image capture device of claim 1, wherein the motion estimation unit is further configured to:
   determine a movement metric for all movements by using a first norm threshold; and
   compute a ratio between all bins in the data bin meeting or exceeding the first norm threshold and all bins in the data bin.

3. The image capture device of claim 2, wherein the motion estimation unit is further configured to:
   determine a second movement metric for all medium movements by using a second norm threshold; and
   compute a second ratio between all bins in the data bin meeting or exceeding the second norm threshold and all bins in the data bin.

4. The image capture device of claim 3, wherein the motion estimation unit is further configured to:
   determine a third movement metric for all big movements by using a third norm threshold; and
   compute a third ratio between all bins in the data bin meeting or exceeding the third norm threshold and all bins in the data bin.

5. The image capture device of claim 1, wherein the motion estimation unit is further configured to:
   apply a weight vector to the data bin to generate a weighted data bin to favor defined movement metrics.

6. The image capture device of claim 5, wherein the defined movement metrics have a norm threshold greater than unity.

7. The image capture device of claim 5, wherein the weight vector has increasingly greater weight values for increasingly higher valued norms.

8. The image capture device of claim 1, wherein the image metric is one of high dynamic range and light intensity.

9. A method for automated camera mode selection, the method comprising:
   receiving local motion vectors corresponding to motion or movement in a scene of an image to capture;
   computing a norm for each local motion vector;
   generating a histogram from the computed norms;
   determining movement metrics based on ratios of the histograms for different norm thresholds, wherein the determining comprising:
      setting a defined norm threshold for each movement metric; and
      computing a ratio between all bins in the histogram meeting or exceeding the defined norm threshold and all bins in the histogram;
   identifying a level of movement in the scene based on the movement metrics; and
   applying the identified level of movement to select a camera mode for a camera for capturing the image.

10. The method of claim 9, further comprising:
    multiplying the histogram with a weight vector to generate a weighted histogram which favors movement metrics having norm thresholds greater than unity.

11. The method of claim 10, wherein the weight vector has increasingly greater weight values for increasingly higher valued defined norm thresholds.

12. The method of claim 10, wherein the weight vector has a non-unitary weight for each defined norm threshold greater than unity.

13. The method of claim 9, further comprising:
    skewing the histogram with a weight vector toward certain defined movement metric thresholds.

14. A method for automated camera mode selection, the method comprising:
    determining, for a scene of an image to capture, at least one image metric based on an associated image metric input;
    computing norms, a norm corresponding to a local motion vector;
    producing a data bin from the computed norms, the data bin including bins;
    determining different movement metrics based on computing different ratios of all bins in the data bin associated with different norm thresholds and all bins in the data bin;
    determining, for the scene, a motion level based on the determined different movement metrics;
    selecting a camera mode to use for capturing the image based on each determined image metric and the motion level; and
    capturing the image according to the selected camera mode.

15. The method of claim 14, wherein the determining different movement metrics further comprises:
    providing a set of defined movement metric thresholds;
    computing ratios of data bins for each defined movement metric threshold; and
    establishing the motion level in the scene based on the computed ratios.

16. The method of claim 15, further comprising:
    skewing the data bins with a weight vector toward certain defined movement metric thresholds.

17. The method of claim 16, wherein the certain defined movement metric thresholds are greater than one.

18. The method of claim 16, wherein increasingly greater weights are applied to increasingly higher defined movement metric thresholds.

19. The method of claim 16, wherein the weight vector has a non-unitary weight for each defined movement metric threshold greater than unity.

20. The method of claim 16, wherein at least one image metric is one of high dynamic range and light intensity.

* * * * *